(12) United States Patent
Fifer et al.

(10) Patent No.: US 7,827,592 B2
(45) Date of Patent: Nov. 2, 2010

(54) IMPLICIT AUTHENTICATION TO COMPUTER RESOURCES AND ERROR RECOVERY

(75) Inventors: Nicholas D. Fifer, Tucson, AZ (US); Itzhack Goldberg, Hadera, IL (US); Julianne F. Haugh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 11/743,297

(22) Filed: May 2, 2007

(65) Prior Publication Data
US 2008/0276306 A1 Nov. 6, 2008

(51) Int. Cl.
*H04L 9/32* (2006.01)
(52) U.S. Cl. .................... 726/2; 726/3; 726/4
(58) Field of Classification Search ............... 726/1–10, 726/16–20; 713/150, 155, 168, 181–186, 713/193–194
See application file for complete search history.

(56) References Cited

U.S. PATENT DOCUMENTS

| | | | |
|---|---|---|---|
| 6,161,185 A * | 12/2000 | Guthrie et al. | 726/5 |
| 6,226,749 B1 | 5/2001 | Carloganu et al. | |
| 6,651,168 B1 | 11/2003 | Kao et al. | |
| 7,039,812 B2 | 5/2006 | Kawan et al. | |

FOREIGN PATENT DOCUMENTS

| JP | 2004258845 A | 9/2004 |
|---|---|---|
| JP | 2006171857 A | 6/2006 |

OTHER PUBLICATIONS

Coull, Scott with Joel Branch, Boleslaw Szymanski and Eric Breimer, "Intrusion Detection: A Bioinformatics Approach," Rensselaer Polytechnic Institute, Troy, New York; Siena College, Loudonville, New York.

Odaka, T. et al., "An Authentication Method Based on the Characteristics of the Command Sequence," May 2002, Transactions of the Institute of Electronics, Information and Communication Engineers B, Bol. J85-B No. 5, pp. 476-478.

Inoue, Y. et al., "An Authentication Method Based on the Command Sequences," Mar. 2006, Memoirs of the Faculty of Engineering, Fukui University, vol. 54, No. 1, pp. 59-68.

* cited by examiner

*Primary Examiner*—Hosuk Song
(74) *Attorney, Agent, or Firm*—Griffiths & Seaton PLLC

(57) ABSTRACT

A method for implicit authorization to a computer resource includes defining a behavioral signature including a plurality of defined computer actions known to an authorized user of the computer resource. A first performed computer action of a user is registered. The first performed computer action is compared with a first defined computer action of the plurality of defined computer actions, wherein, if the first performed computer action and the first defined computer action match, an authentication state is changed from a first authentication state to a second authentication state.

20 Claims, 3 Drawing Sheets

IMPLICIT AUTHENTICATION TO COMPUTER RESOURCES AND ERROR RECOVERY

BACKGROUND OF THE INVENTION

1. Field of the Invention

The present invention relates in general to computers, and more particularly to a method and process for implicit authentication to computer resources and error recovery.

2. Description of the Prior Art

Computers and connectivity to computers, particularly from remote locations, have increased dramatically and continue to increase. As a result, computers and their respective software and firmware applications are increasingly vulnerable to attack from unauthorized users. In general, it is more beneficial to prevent an unauthorized user from entering a computer environment than to take remedial action when the unauthorized user is already inside the environment. However, many phishing schemes and Trojan horses allow intruders access to compromised accounts in computing environments.

In the current art, there are already some solutions that recognize the need for an on-going user validation through mid-stream questions and the like. However, employing such techniques could alert the intruders to the fact that they are being monitored and experienced intruders might know the answers to even the toughest questions. Additionally, reauthorization questions consist of the same known information, much like the way certain websites periodically prompt for the user's password at random time intervals.

The idea of first "learning the behavioral patterns" of users and then comparing the behavioral patterns to the actual activities of suspect users are well documented for several decades. A number of issues, however, still remain unresolved with known approaches. By insisting on so-called "passive learning" of a user's behavior, room is left for false alarms. For example, in the case where a user performs new actions that have never been done before (e.g., they may have never been needed), the computing environment might give a false alarm and aggravate the user who tried to carry out a valid transaction and is now blocked, allegedly for his/her own security's sake.

Also, having two modes of operation, learn and active, implies that such a system cannot be used right away because it needs time to learn the actions of users. During that time, the computer system or computer environment is potentially exposed to attacks.

SUMMARY OF THE INVENTION

A much simpler technique, involving legitimate users, is needed to eliminate some of the drawbacks of the artificial intelligence approach mentioned in the prior art. The technique should make use of existing computing devices, components, and related applications to provide an efficient and cost-effective solution. What is needed is a novel approach that will allow for the attacked organization/institute to identify an intruder and possibly divert the intruder to a fake account, so that vital information and data can be accumulated about the nature of the intrusion. In this way, an intruder is not being alerted to the fact that someone is aware of the intrusion and might help in tracking the intruder down and prosecute him. All of this detective work can be done without putting the real account in danger. Additionally, what is needed is a recovery mechanism such that a user may perform a reasonably "safe" action and undo the potentially false alarm.

Accordingly, in one embodiment, the present invention is a method for implicit authorization to a computer resource comprising defining a behavioral signature having a plurality of defined computer actions known to an authorized user of the computer resource, registering a first performed computer action of the user, and comparing the first performed computer action with a first defined computer action of the plurality of defined computer actions, and if the first performed computer action and the first defined computer action match, changing an authentication state from a first authentication state to a second authentication state.

In another embodiment, the present invention is an implicit authorization method comprising comparing a first performed computer action of a user with a first defined computer action of a plurality of defined computer actions known to an authorized user, the plurality of defined computer actions forming a behavioral signature, wherein, if the first performed computer action matches the first defined computer action, an authentication state is changed from a first authentication state to a second authentication state.

In still another embodiment, the present invention is an article of manufacture including code implicit authorization of a computer resource, wherein the code is capable of causing operations to be performed comprising defining a behavioral signature including a plurality of defined computer actions known to an authorized user of the computer resource, registering a first performed computer action of a user, and comparing the first performed computer action with a first defined computer action of the plurality of defined computer action, wherein, if the first performed computer action and the first defined computer action match, an authentication state is changed from a first authentication state to a second authentication state.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENTS OF THE INVENTION

Figure 1:
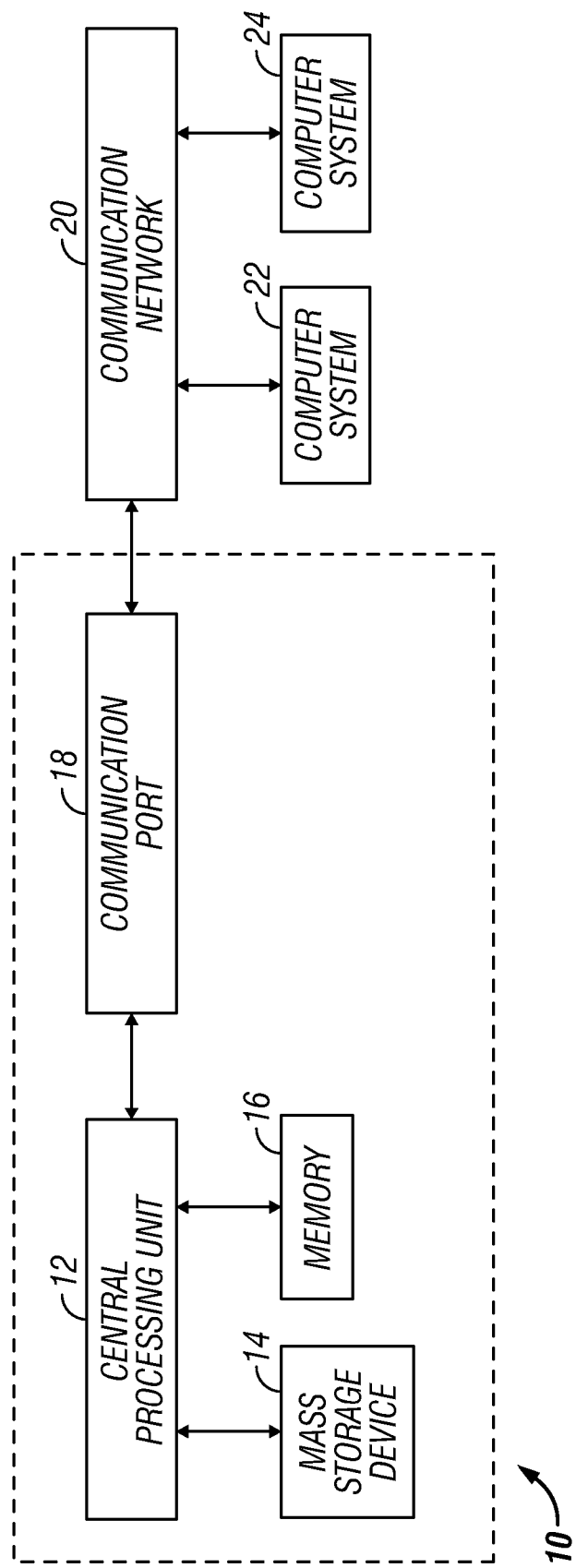
FIG. 1 illustrates a computer system environment having an example storage device in which aspects of the present invention can be realized.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, a digital-video disk, a magnetic tape, a Bernoulli drive, a magnetic disk, a punch card, a flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

An example of a computer system 10 that can implement various aspects of the present invention is depicted in FIG. 1. Computer system 10 includes central processing unit module (CPU) 12, which is connected to mass storage device(s) module(s) 14 and memory device 16. Mass storage devices can include hard disk drive (HDD) devices that can be configured in a redundant array of independent disks (RAID). The backup operations can be executed on device(s) 14 located in system 10, or elsewhere. Memory device 16 can include such memory as electrically erasable programmable read only memory (EEPROM) or a host of related devices. Memory device 16 and mass storage device 14 are connected to CPU 12 via a signal bearing medium. In addition, CPU 12 is connected through communication port 18 to a communication network 20 attached to a plurality of additional computer systems 22 and 24.

The present invention presents an implicit method of authenticating to a computer resource. For the purposes of this disclosure, such authentication means that a user performs a computer "action" and thereby identifies himself to the system through a hardcoded behavioral "signature." An example of a so-called "computer action" can include such tasks as executing a small number of specific commands or actions. A more specific example can include accessing a specific feature on a website or viewing a specific file on a computer system. The user's actions on the computer environment could be limited until the computer action was performed.

Non-obvious and unrelated error messages can be provided to indicate to the user that they have not yet performed an implicit authentication step. The errors are unrelated to the actual error state (authentication failure). Examples can include HTTP 404 ("Not Found") errors for certain parts of a website rather than the more common HTTP 401 or 403 ("Unauthorized" and "Forbidden") errors. Other errors may be used creatively to subtly indicate to the user that something is amiss.

In some instances, and with some interfaces, it may be desirable to perform an action that other software, such as an active learning and monitoring component based on Artificial Intelligence as described in the prior art, might flag as a security violation. Certain interfaces, such as bank ATMs and credit card authorization mechanisms, do not have explicit user interfaces. These interfaces might benefit from an implicit "override" mechanism that would allow a transaction to take place that otherwise might have been denied.

Any pre-configured activity (or set of activities/commands/actions) can comprise the "implicit" authentication procedure. For instance, one can configure this implicit secondary authentication mechanism to watch for the following command execution sequence (the example given is for a UNIX-compatible operating system): pwd; cd certaindDirName; cat /etc/passwd; . . . . This might be the sequence of commands required prior to viewing the /etc/password file. That is, users may not display the contents of the file "/etc/passwd" unless they have signaled the system first of their intent by requesting the name of the current directory, followed by changing to a pre-specified directory. By executing these commands (not necessarily right after logging in, but within a specific time period, or a number of commands issued, or prior to performing a specific command or access request), the users identify themselves to the system without being prompted. An eavesdropping intruder is not prompted to perform these actions and therefore is not explicitly notified as to the nature of the secret or the existence of the mechanism; as such, the intruder should not have a clue as to what this "secret" sequence of commands is and may not be aware that there is such a mechanism in place.

If the prior art, as a so-called "behavior-learning" technique is utilized, an eavesdropper might be able to imitate a genuine user by simply re-running a history file (including for instance typing the exact sequence of the steps, some of which may be ignored by the system), while, having a strict pre-configured action-password, a genuine user is not likely to repeat the key sequence or actions about to be ignored. As such, due to the fact that the ignored sequence is repeated, an intruder can reveal himself. For example, if the secondary authentication method required that a specific command sequence be entered within one (1) minute or five (5) commands, the intruder would have one (1) minute or five (5) commands to determine how the valid user is authenticated. After that, even if the user were able to replay all of the commands they might find within the history file, the intruder would already have been flagged as an intruder.

Additional needs for secondary authentication can be added according to the present invention. Consider, for example, the act of changing ones password on a system, whether by command line or graphical interface. Were an intruder permitted to change a user's password, even using all of the various protection mechanisms, such as using a "trusted path" or encrypted communications pathway, the account would now have been hijacked and the legitimate user would be unable to regain access without having the password reset. If the user did not access his account on a regular basis, he would be unable to detect that the account had been hijacked. During this time period, the intruder would have unlimited access to the account. In the case of the "change a password" action, an additional sequence of commands might be configured such that they are required. Thus, even if the intruder knew the password and any security questions, he/she would not know which of the previous actions were required before the password could be changed.

In the present invention, a non-privileged user is able to define a sequence of actions that is required in order for another action or state within the system to occur or be maintained. The requirements for performing these actions are themselves subject to either user or administrator configuration. Each user action and/or state is verified against the current state and based on the requested action a new state is created. Many users perform certain actions as a matter of habit and these actions would not necessarily create an undue burden.

For example, at the time that a user signs into a system, whether through a command line interface, GUI or web browser, an initial authentication state $S(0)$ is created. A new authentication state, $S(1)$, is required before a user can perform some number of other actions, such as executing a command, performing an action within a GUI, or viewing a web page. Numerous other states, $S(2)$ through $S(n)$, can be defined such that each state must exist before some other command or action can occur.

To demonstrate one embodiment of the present invention, the transition from $S(0)$ to $S(1)$ is defined in terms of one or more other actions and a limitation is placed on $S(1)$ such that, if $S(1)$ is not attained within a specific time period or number of command executions, an intrusion alert is issued. The one or more actions required to transition from $S(0)$ to $S(1)$ are then defined by the user. Thus, when the user executes a command or action in state $S(0)$, that command or action is compared to the first command or action within that list of one or more required commands or actions and a state change from $S(0)$ to $S(1)$ is performed.

When the second command or action within the list of one or more required actions is performed, a state change from $S(1)$ to $S(2)$ occurs. In the event the user is in state $S(1)$ and the command or action does not match the next required action in the list of one or more required commands or actions, the user's state reverts to its original value, $S(0)$, in this example. This type of behavior is common in a variety of parsers, such as those used by compilers or command line parsers. Tokens are recognized within states, shifts from one state to the next are performed based on the current state, and, when the final token is seen, the "statement" within the programming language or command line parser is "reduced" to a new state.

As with parsers, as described above, "warnings" are generated when a set of state transitions does not occur according to the appropriate "grammar." In one embodiment of the present invention, these "warnings" may take the form of error messages or transfers to a simulated environment that is used to proactively begin gathering information about the intruder. Returning briefly to the example of programming language compilers, a common error message is "missing ';'" ("missing semicolon"), which indicates that a semicolon character is missing from the statement. This may not indicate the exact nature of the syntax error, but instead represents the compiler writer's best guess as to what is required. Now, applying this same concept to the instant example, the system might deny access to a file, program, web page, GUI action, etc. when an intruder is first suspected. As with programming language compilers, the warning might not represent the actual error, but rather act as a hint to the user that something is amiss.

Returning now to the earliest example wherein a user was required to view his current directory and change to a specific directory in order to view the /etc/passwd file if the "pwd" or "cd certainDirName" commands were not executed immediately prior to "cat /etc/passwd", an error message such as "cat: no more processes" (this is an error that might occur if the user or system had transiently exceeded a running process limit) might be produced. This is not an actual error, but it serves as a hint to users that they need to execute the correct commands. Should at user fail to do so, he would be flagged as an intruder and the appropriate actions consistent with a security plan could be implemented against the intruder.

So far, embodiments of the present invention have centered around the validation of a user identity. Another embodiment of the invention can include techniques for recovering from false positives that might otherwise deny user access to a resource, such as their command line login, GUI interface, or web-based application. A common problem, which occurs within a different field, is presently described. In addition, an embodiment of the present invention in which the "false positive" can be recovered is presently described.

Consider the instance of an individual, such as a credit card user, who is traveling and thus acting in a manner that is not typical of the user when at home. This might correspond to a web-based application that a user uses in a similar manner for 51 weeks of the year and then, in one particular week, unusual actions are performed. Using traditional artificial intelligence tools for detecting fraudulent activity, a user's credit card may become locked because he has suddenly eaten dinner at an expensive restaurant after having purchased expensive gifts.

Likewise, a user who routinely withdraws some amount of money from a savings account and transfers it to his personal banking account might be blocked because he typically does not withdraw money. In such a situation, a learning approach would fail because a credit card or web-based application has not had an opportunity to learn the behavior.

To demonstrate the error recovery functionality of the present invention, an error state E(0) would occur when a user has begun receiving implicit warnings that fraudulent or unauthorized activity is taking place (for example, receiving HTTP 404, "out of memory," "machine too busy," or "credit card transaction denied" errors). In view of the previous discussion of transitions between S(0) and S(n), a similar mechanism can be defined such that a transition from E(0) back to S(0) [where "S(0)" is defined, for the sake of the present discussion, as a "valid and authorized user" state]). Thus, a user who has mistakenly accessed a page that required an implicit secondary authentication can perform a second implicit set of commands to clear the error, or a customer who has eaten an expensive meal in a distant city can clear the "fraud" flag on his card through some implicit act (for example, using a special PIN to view his account balance via an ATM machine).

Figure 2:
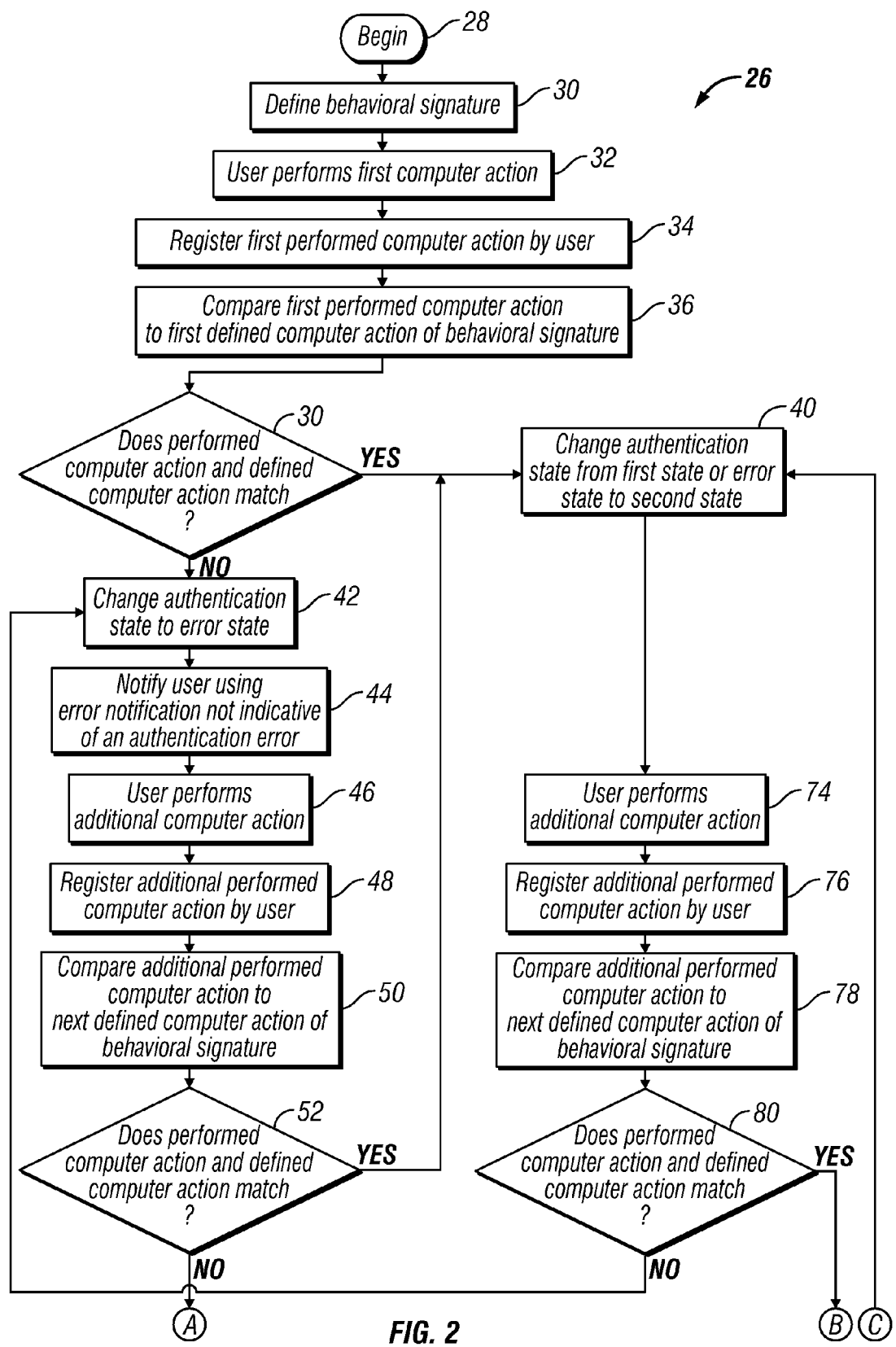
FIG. 2 illustrates an example method of operation in which various aspects of the present invention can be implemented.
Figure 2:
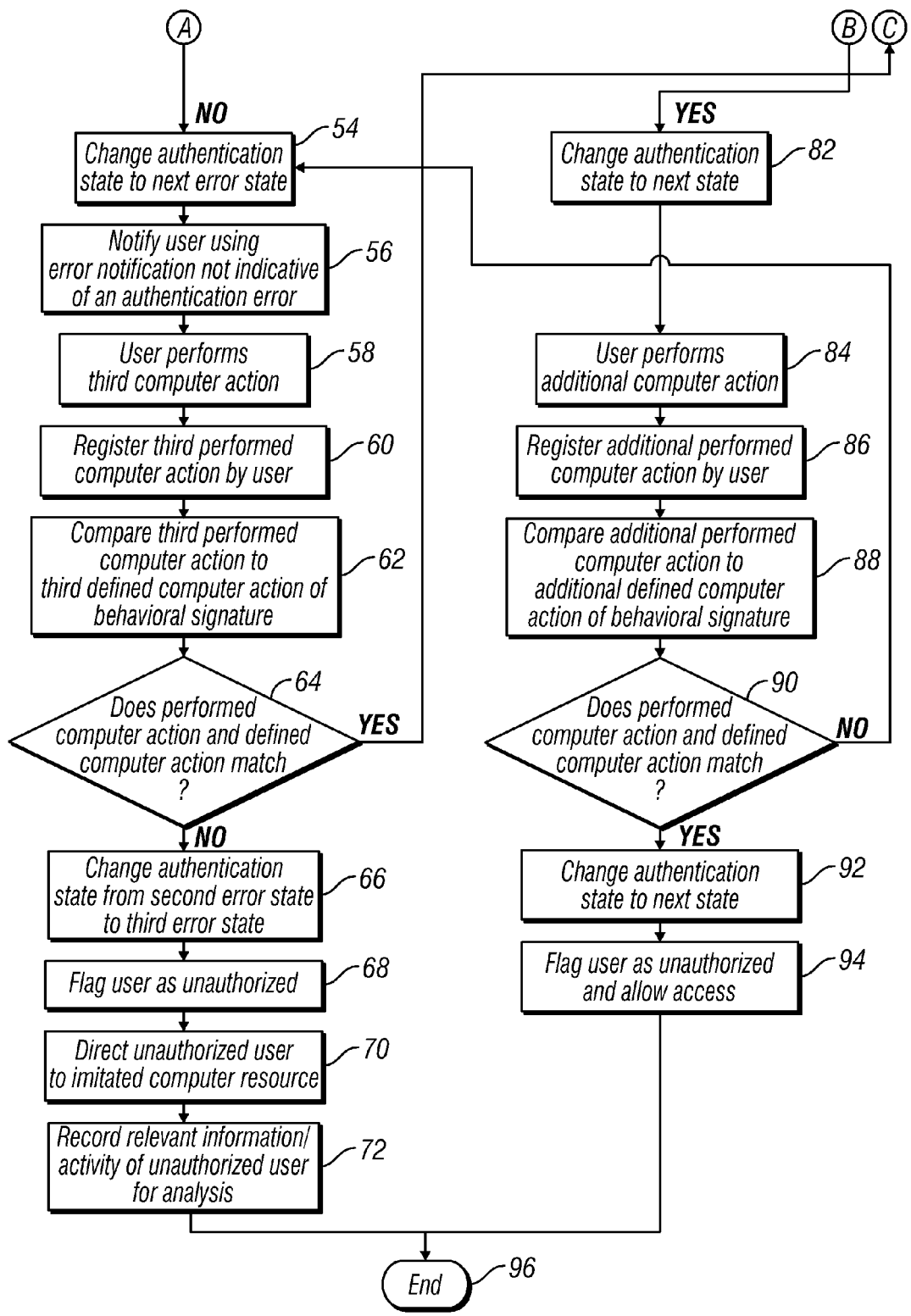

Turning to FIG. 2, an example of a method of operation 26, in which aspects of the present invention can be implemented in various embodiments, is depicted. Method 26 begins (step 28) through the definition of a behavioral signature according to the invention, which can include a set of defined computer actions such as accessing a certain file, as has been previously described (step 30). The defined computer actions constituting the behavioral signature are known to an authorized user, but unknown to an intruder.

As a next step, a computer user (either authorized or intruder) performs a first computer action (step 32). The computer resource registers the first performed computer action (step 34). The user-performed computer action is compared against a predefined computer action parameter as part of a respective behavioral signature required for authentication to the respective computer resource (step 36).

Here again, as part of the predefined computer action, one parameter can include that the computer action, such as access of a particular file or webpage, should be performed within a preset period of time in order for the actions to "match."

If the performed computer action and the defined computer action match (step 38), then the authentication state S(0) is changed to S(1) accordingly (step 40). If the actions do not match (again, step 38), then the authentication state S(0) is changed to an error state E(0) (step 42). The user is notified using a generated error notification that is not indicative of a true authentication error, as per the foregoing discussion (step 44).

The user then performs an additional computer action (step 46). Again, the additional computer action is registered and compared to the respective stored behavioral signature's computer action (steps 48, 50). In one embodiment, the stored behavioral signature can include simply repeating the existing computer action that is required. In other embodiments, however, according to an error notification scheme following a particular behavioral signature, a user may be required to perform a computer action unrelated to the computer action that was incorrectly registered (either by a lack of registration in a particular time period, a lack of performing the action altogether, or a similar error).

If the additional computer action and the defined computer action match (step 52), then the error authentication state E(0) is changed to a first or second authentication state, S(1) or S(2), depending on the embodiment of the invention. In other embodiments, the satisfaction of the first error condition can change the authentication state from the error state E(0) back to the original authentication state S(0).

If the addition computer action and the defined computer action do not match (again, step 52), the respective authentication state is changed to the next respective error state [in this case, E(1)). Again, a notification is sent (step 56) and the user performs an additional computer action that is again registered and compared (steps 58, 60, 62). If the actions match, then the error state E(1) can change, depending on the embodiment, to a respective "S" authentication state [e.g., S(0), S(1) or S(2)]).

If the actions do not again match, then the respective error state is changed once again to E(2) (step 66), the user is flagged as an unauthorized intruder (step 68), and the intruder is sent to an imitated computer resource (step 70) where relevant information about activities of the intruder can be collected and recorded for analysis (step 72) per the above discussion.

Returning to step 40, where the authentication state is changed as described, here again the user enters additional computer actions that are registered and compared (steps 72, 76, 78). If, at that time, the additional computer actions are consistent with the stored behavioral signature (steps 74, 76, 78, 80), then the authentication state is changed to the next respective state (step 82), such as from S(0) to S(1), etc. Continuing on, the user again performs a computer action that is again registered and compared (steps 84, 86, 88). If the computer actions match (step 90), then the authentication state is again changed [e.g., S(1) to S(2), etc.] (step 92). The user is flagged as an authorized user and allowed to access the computer resource (step 94). Method 26 then ends (step 96).

Software and/or hardware to implement the method 26, and/or other functions previously described, such as the described comparison between performed computer action and defined computer action, can be created using tools currently known in the art. Hardware such as computer system 10 can function to implement the authentication method 26. For example, the defined computer action can be stored as part of mass storage device 14. The implementation of the described system and method involves no significant additional expenditure of resources or additional hardware than what is already in use in standard computing environments, which makes the implementation cost-effective.

Implementing and utilizing the examples of authentication schemes as described can provide a simple, effective method of providing an effective, implicit method of access to a computer resource as described. While one or more embodiments of the present invention have been illustrated in detail, the skilled artisan will appreciate that modifications and adaptations to those embodiments may be made without departing from the scope of the present invention as set forth in the following claims.

What is claimed is:

1. A method for implicit authorization to a computer resource, comprising:
   defining a behavioral signature having a plurality of defined computer actions known to an authorized user of the computer resource;
   registering a first performed computer action of a user;
   comparing the first performed computer action with a first defined computer action of the plurality of defined computer actions; and
   if the first performed computer action and the first defined computer action match, changing an authentication state from a first authentication state to a second authentication state.

2. The method of claim 1, wherein, in order to change the authentication state from the first authentication state to the second authentication state, the first performed computer action must additionally be completed within a predetermined period of time.

3. The method of claim 1, further including registering a second performed computer action of a user, and comparing the second performed computer action with a second defined computer action of the plurality of defined computer operations, and, if the second performed computer action and the second defined computer action match, changing the authentication state from the second authentication state to a third authentication state.

4. The method of claim 1, wherein, if the first performed computer action and the first defined computer action do not match, the authentication state is changed from the first authentication state to a first error state.

5. The method of claim 4, further including generating an error notification to the user wherein said error notification is, not indicative of an authentication error.

6. The method of claim 5, wherein the error notification includes an HTTP 404 file not found error.

7. The method of claim 1, wherein the first defined computer action includes accessing a predetermined computer file.

8. An implicit authorization method, comprising:
comparing a first performed computer action of a user with a first defined computer action of a plurality of defined computer actions known to an authorized user, the plurality of defined computer actions forming a behavioral signature, wherein, if the first performed computer action matches the first defined computer action, an authentication state is changed from a first authentication state to a second authentication state.

9. The method of claim 8, wherein, according to the behavioral signature, the first performed computer action must also be completed within a predetermined period of time to change the authentication state from the first authentication state to the second authentication state.

10. The method of claim 8, further including comparing a second performed computer action with a second defined computer action, and, if the second performed computer action and the second defined computer action match, changing the authentication state from the second authentication state to a third authentication state.

11. The method of claim 8, wherein, if the first performed computer action and the first defined computer action do not match, the authentication state is changed from the first authentication state to a first error state.

12. The method of claim 11, further including generating an error notification to the user, wherein said error notification is not indicative of an authentication error.

13. The method of claim 12, wherein the error notification includes an HTTP 404 file not found error.

14. The method of claim 8, wherein the first defined computer action includes accessing a predetermined computer file.

15. A computer program product for establishing a generic remote connection to a command line interface (CLI) application, the computer program product comprising a computer-readable storage medium having computer-readable program code portions stored therein, the computer-readable program code portions comprising:
a first executable portion for implementing a server configured for defining a behavioral signature including a plurality of defined computer actions known to an authorized user of the computer resource;
registering a first performed computer action of a user;
comparing the first performed computer action with a first defined computer action of the plurality of defined computer action; and
if the first performed computer action and the first defined computer action match, changing an authentication state from a first authentication state to a second authentication state.

16. The computer program product of claim 15, wherein in order to change the authentication state from the first authentication state to the second authentication state, the first performed computer action must additionally be completed within a predetermined period of time.

17. The computer program product of claim 15, further including a second executable portion capable of registering a second performed computer action of a user, and comparing the second performed computer action with a second defined computer action of the plurality of defined computer operations, and, if the second performed computer action and the second defined computer action match, changing the authentication state from the second authentication state to a third authentication state.

18. The computer program product of claim 15, wherein, if the first performed computer action and the first defined computer action do not match, the authentication state is changed from the first authentication state to a first error state.

19. The computer program product of claim 18, further including a third executable portion capable of generating an error notification to the user, wherein said error notification is not indicative of an authentication error.

20. The computer program product of claim 19, wherein the error notification includes an HTTP 404 file not found error.

* * * * *